(12) United States Patent
Natarajan

(10) Patent No.: US 7,451,198 B2
(45) Date of Patent: Nov. 11, 2008

(54) WAP XML EXTENSION FOR WIFI AND DESKTOP PASSTHROUGH CONNECTIONS

(75) Inventor: Sureshkumar Natarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/701,130

(22) Filed: Nov. 3, 2003

(65) Prior Publication Data

US 2005/0047046 A1 Mar. 3, 2005

Related U.S. Application Data

(60) Provisional application No. 60/498,865, filed on Aug. 29, 2003.

(51) Int. Cl.
*G06F 15/177* (2006.01)
*G06F 9/00* (2006.01)
*G06F 9/24* (2006.01)
*G06F 1/24* (2006.01)
*G06F 9/44* (2006.01)

(52) U.S. Cl. .................. 709/221; 709/220; 709/222; 709/227; 709/228; 709/250; 713/1; 713/100; 717/168; 717/171; 717/173

(58) Field of Classification Search .................. 709/221
See application file for complete search history.

(56) References Cited

U.S. PATENT DOCUMENTS

| | | | |
|---|---|---|---|
| 6,195,531 B1 * | 2/2001 | Aguirre et al. | 455/11.1 |
| 6,640,097 B2 * | 10/2003 | Corrigan et al. | 455/14.1 |
| 7,054,924 B1 * | 5/2006 | Harvey et al. | 709/220 |
| 2001/0051533 A1 * | 12/2001 | Wietzke et al. | 455/564 |
| 2002/0068554 A1 * | 6/2002 | Dusse | 455/419 |
| 2002/0101848 A1 * | 8/2002 | Lee et al. | 370/349 |
| 2002/0131404 A1 * | 9/2002 | Mehta et al. | 370/352 |
| 2003/0026211 A1 * | 2/2003 | Xu et al. | 370/252 |
| 2003/0027581 A1 * | 2/2003 | Jokinen et al. | 455/456 |
| 2003/0045311 A1 * | 3/2003 | Larikka et al. | 455/466 |
| 2003/0084165 A1 * | 5/2003 | Kjellberg et al. | 709/227 |
| 2003/0084177 A1 * | 5/2003 | Mulligan | 709/230 |
| 2003/0210700 A1 * | 11/2003 | Chen | 370/401 |
| 2004/0002952 A1 * | 1/2004 | Lee et al. | 707/1 |
| 2004/0024660 A1 * | 2/2004 | Ganesh et al. | 705/28 |
| 2004/0075675 A1 * | 4/2004 | Raivisto et al. | 340/700 |

(Continued)

OTHER PUBLICATIONS

Joshua Piven; *Time to Say "Bye-Bye" to Wifi?*; Jan. 2002, vol. XXII No. 1, p. 1; pp. 42-43; Computer Technology Review.

(Continued)

*Primary Examiner*—Nathan Flynn
*Assistant Examiner*—Daniel Murray
(74) *Attorney, Agent, or Firm*—Merchant & Gould PC

(57) ABSTRACT

Mobile devices are automatically provisioned for network access using WiFi and/or DTPT (DeskTop-PassThrough) connection settings. The connection settings allow the users to access meta-networks (such as the Internet or a corporate network) without any manual intervention. According to an embodiment of the invention, an XML-based mechanism uses the Wireless Application Protocol (WAP) XML structure and extends the structure to define WiFi and DTPT connections. The defined WiFi and DTPT connections are provisioned onto the mobile devices automatically, for example, through wireless communications or by a corporate IT application.

25 Claims, 4 Drawing Sheets

U.S. PATENT DOCUMENTS

2005/0204068 A1* 9/2005 Zhu et al. .................. 709/252
2006/0236363 A1* 10/2006 Heard et al. .................. 726/1
2006/0242685 A1* 10/2006 Heard et al. .................. 726/3

OTHER PUBLICATIONS

A. Calvagna, G. Morabito, A. La Corte; *WiFi Bridge: Wireless Mobility Framework Supporting Session Continuity*; 2003 IEEE; pp. 79-86.

A. Calvagna, G. Morabito, A. Pappalardo; *WiFi Mobility Framework Supporting GPRS Roaming: Design and Implementation*; 2003 IEEE: pp. 116-120.

J. B. Miles; *Evolving Standards Expand Wireless Reach. (Buyers Guide)*; Government Computer News vol. 20 No. 2, Jan. 22, 2001.

Andrew Garcia; *Tightening WLAN Security*; eWeek Sep. 4, 2001.

Carmen Nobel; *Putting Focus on WLANs*; May 7, 2001.

Kevin Jonah; *Securing the Airways*; May 6, 2002; vol. 21 No. 10.

* cited by examiner

WAP XML EXTENSION FOR WIFI AND DESKTOP PASSTHROUGH CONNECTIONS

RELATED APPLICATIONS

This utility patent application claims the benefit under 35 United States Code § 119(e) of U.S. Provisional Patent Application No. 60/498,865 filed on Aug. 29, 2003 and entitled WAP XML EXTENSION FOR WIFI AND DESKTOP PASSTHROUGH CONNECTIONS.

BACKGROUND OF THE INVENTION

Today, there are a variety of mobile devices that are designed to interface with a variety of networks. For example, there are personal digital assistants, "smart" phones, pocket PCs, laptop computers, and the like. Increasingly, these devices include capabilities for communicating across an increasing number of networks. Often, users of the mobile devices communicate across various networks of varying kinds as a user travels through different regions having differing connectivity to networks.

The mobile devices are "provisioned" with information that allows the user to access the various networks. For example, the user can manually enter the information required to access a particular network. Additionally, the mobile devices can be "pre-provisioned" by a manufacturer or a service provider so that the user does not have to manually enter access information. Provisioning information on mobile devices may have to be added or changed as the user seeks to access networks that have not been provisioned on a particular mobile device.

SUMMARY OF THE INVENTION

The present invention is directed towards improved usability of mobile devices across various networks. One aspect in which the usability is improved is by improving the provisioning of the mobile device for communication across specific networks. When a particular mobile device does not contain any network provisioning information, the information must be entered into the mobile device to enable network communications. Often, the user is required to manually enter provisioning information, which often results in errors and frustration for the user. Alternatively, a memory device, such as a Subscribers Identification Module ("SIM card"), can be preprogrammed with the provisioning information and inserted into the mobile device. However, using a preprogrammed memory device involves limitations associated with hardware solutions such as cost, and distribution, and maintenance.

The present invention provides automatic provisioning of mobile devices with WiFi and/or DTPT (DeskTop-PassThrough) connection settings. The connection settings allow the users to access meta-networks (such as the Internet or a corporate network) without any manual intervention. According to an embodiment of the invention, an XML-based mechanism uses the Wireless Application Protocol (WAP) XML structure and extends the structure to define WiFi and DTPT connections. The defined WiFi and DTPT connections are provisioned onto the mobile devices automatically, for example, through wireless communications or by a corporate IT application.

DETAILED DESCRIPTION OF THE PREFERRED EMBODIMENT

Briefly stated, the present invention is directed at efficiently downloading information of interest to a mobile device. The information of interest may be based on file types supported by the mobile device, the amount of storage available on the mobile device, and the like. These and other aspects of the invention will become apparent to those skilled in the art after reading the following detailed description.

Illustrative Operating Environment

Figure 1:
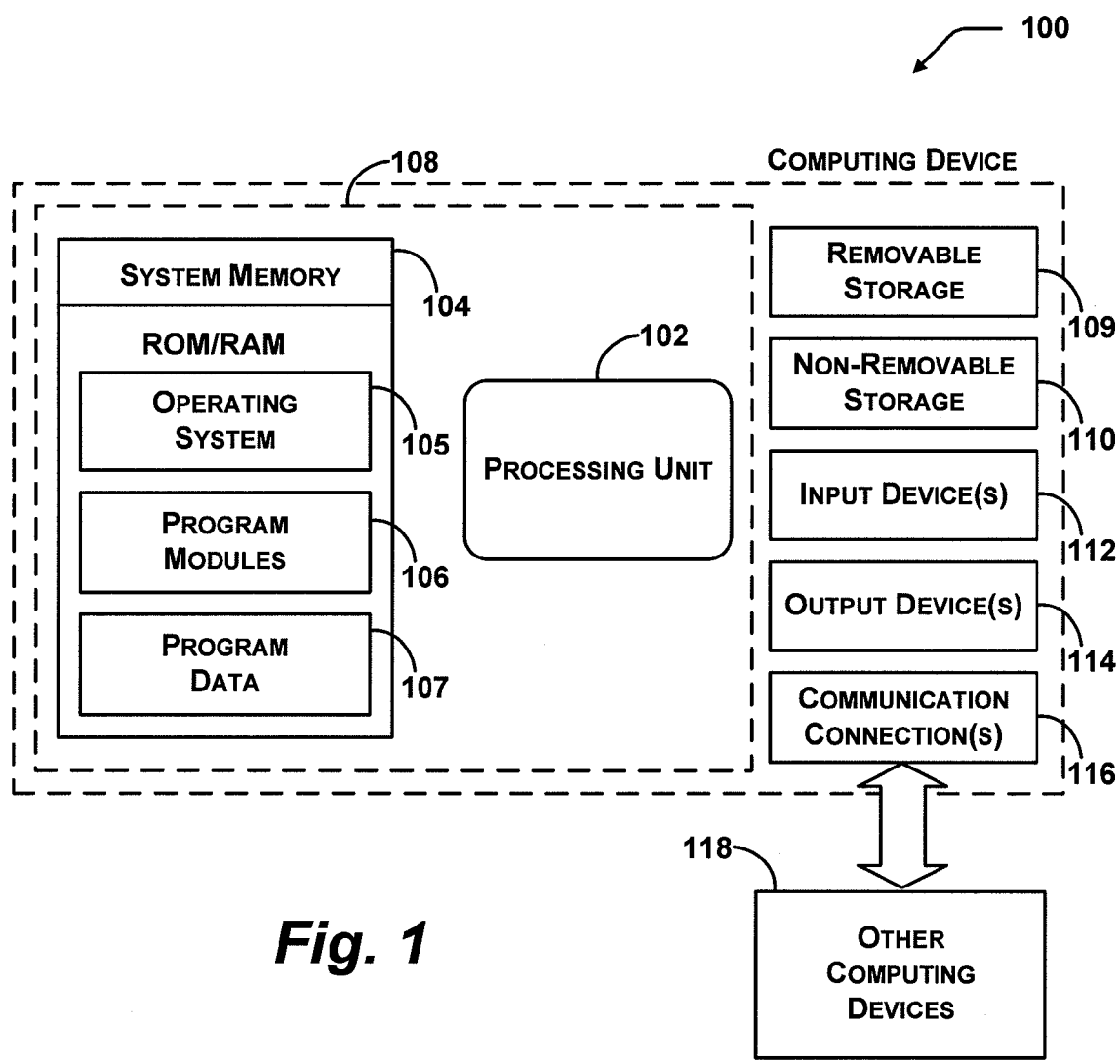
FIG. 1 illustrates an exemplary computing device that may be used in one exemplary embodiment, in accordance with aspects of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
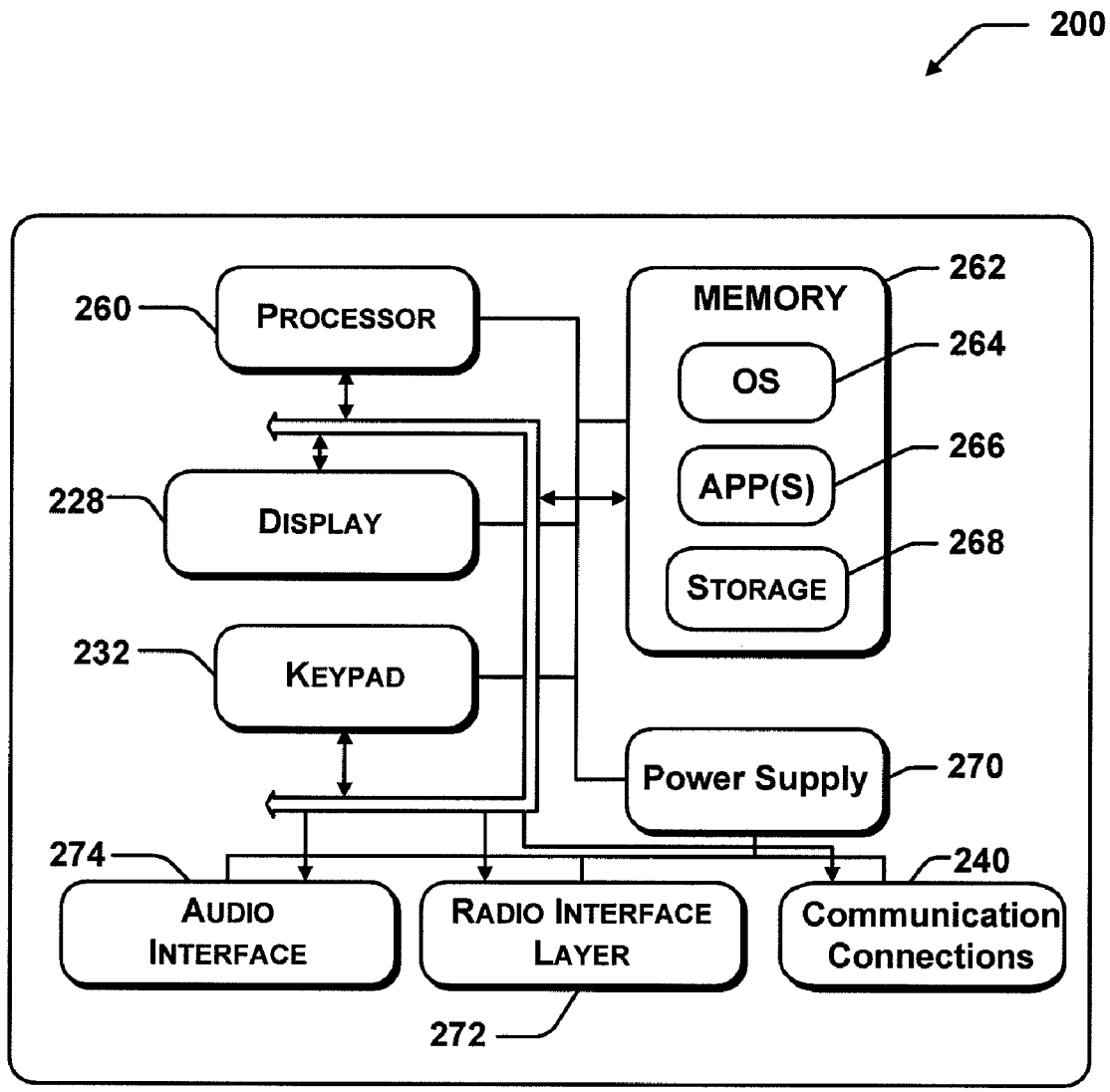
FIG. 2 illustrates an exemplary mobile device that may be used in one exemplary embodiment, in accordance with aspects of the present invention.

With reference to FIG. 2, one exemplary system for implementing the invention includes a computing device configured as a mobile device, such as mobile device 200. The mobile device 200 has a processor 260, a memory 262, a display 228, peripheral device port, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port may be of the type to accept additional memory cards, game cards, modem cards, or other peripheral devices.

One or more application programs 266 are loaded into memory 262 and run on the operating system 264. Examples of application programs include phone dialer programs, installation wizard programs, email programs, scheduling programs, PIM (personal information management) programs, word processing programs, spreadsheet programs, Internet browser programs, and so forth. The mobile computing device 200 also includes non-volitile storage 268 within the memory 262. The non-volitile storage 268 may be used to store persistent information which should not be lost if the mobile computing device 200 is powered down. The application 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED and an audio interface 274. These devices may be directly coupled to the power supply 270 so that when activated, they remain on for a duration dictated by the notification mechanism even though the processor 260 and other components might shut down to conserve battery power. The LED may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

Mobile computing device 200 may also contain communication connections 240 that allow the device to communicate with other computing devices, such as over a wireless network. The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Wifi and DTPT System

Figure 3:
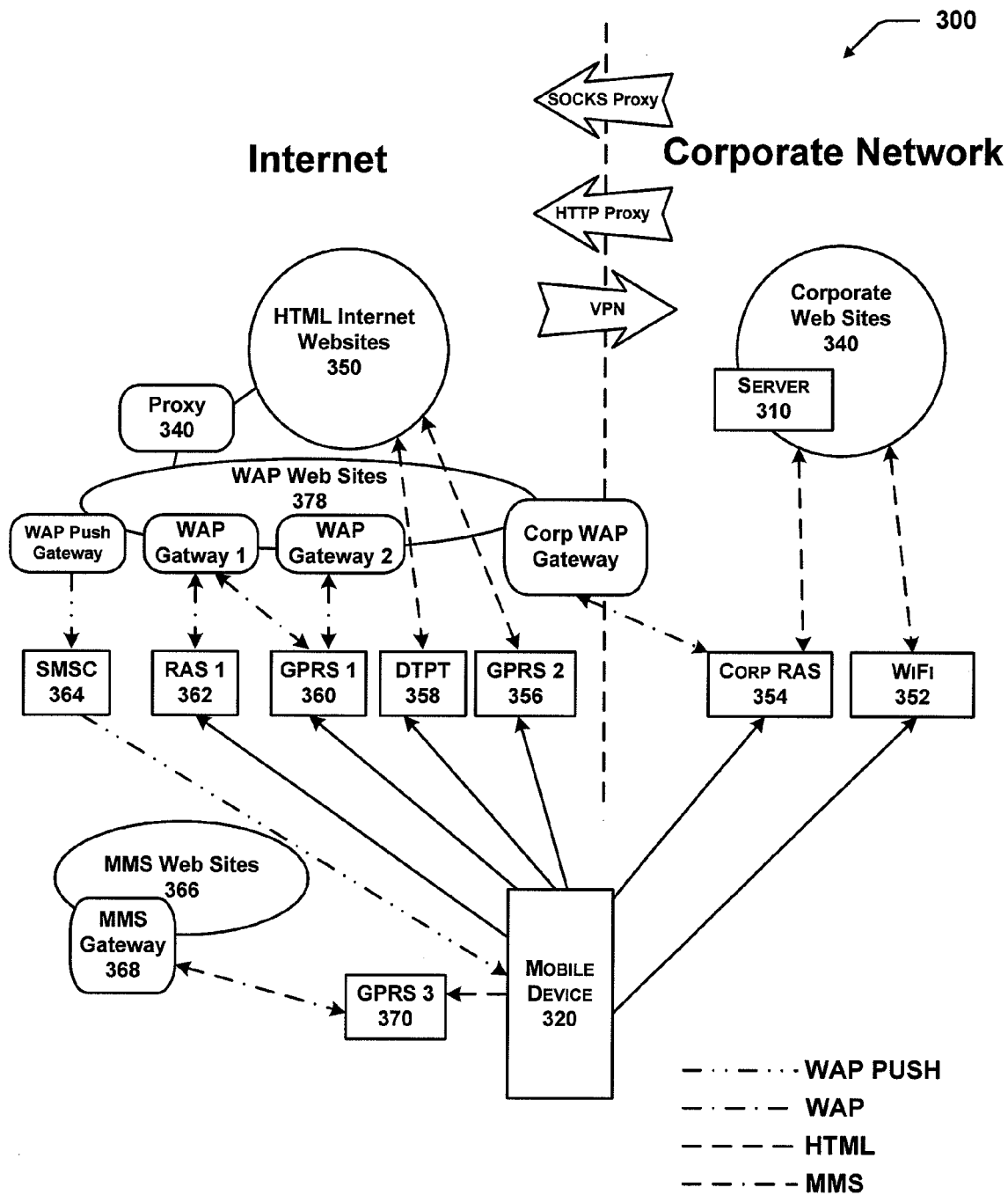
FIG. 3 is a functional block diagram generally illustrating a passthrough provisioning system, in accordance with aspects of the invention.

FIG. 3 is a functional block diagram generally illustrating a passthrough provisioning system 300, in accordance with aspects of the invention. Server 310 is a computing device such as the one described above in conjunction with FIG. 1, and the mobile device 320 is a mobile computing device such as the one described above in conjunction with FIG. 2.

In one embodiment of the present invention, server 310 is configured as a server on a corporate network creating a secure connection to corporate network 340. An example of a WAN is the Internet (350), which connects millions of computers over a host of gateways, routers, switches, hubs, and the like. An example of a LAN is a network used to connect computers in a single office. A WAN may connect multiple LANs.

Several mobile devices may be associated with one user. For example, the user may have a personal digital assistant, a cellular phone, an email device, and the like. In one embodiment, server 310 maintains a passthrough provisioning database with data on passthrough connections, such as WiFi and/or DTPT connections.

A typical mobile device will have the ability to use multiple connection paths to connect to the Internet or the Corporate Network. A WiFi connection enables communication of a mobile device with the Corporate Network and a DTPT connection enable communication of a mobile device with the Internet. An XML-based mechanism is specified that uses the WAP XML structure and extends it to define such passthrough connections and provision them onto the devices automatically either over-the-air or by an IT application provided by the corporation or any other means (e.g. through SIM card based provisioning, Bluetooth etc.)

As illustrated within FIG. 3, mobile device 320 is capable of connecting to the Internet 350, WAP web sites 378, MMS web sites 366, and to Corporate Network 340. Mobile device 320 connects to corporate web sites 340 using Corp RAS 354 and WiFi 352. Mobile device 320 connects to the Internet 350 through DTPT 358, GPRS 2 356, and through proxy 340. Mobile device 320 connects to WAP web sites 378 through GPRS 1 (360), RAS 1 (362) and SMSC 364. Mobile device 320 connects to MMS web sites 366 through GPRS 3 (370) via MMS gateway 368.

From the corporate network 340 to the WAP web sites there is a path from Corp RAS 354 to a Corp WAP Gateway and to the Internet through a SOCKS proxy and an HTTP proxy. From the Internet to the corporate network a VPN is used.

Passthrough connections are used to establish communications between mobile devices and a meta-network (such as Internet 350 and Corporate Network 340). WiFi (also known as IEEE standard 802.11) and DTPT (such as in a USB connection) are two examples of passthrough connections that are increasingly being used.

WiFi-based wireless networks are increasingly becoming prevalent inside both corporations and public areas like airports, coffee shops, and the like. Accordingly, many newer laptop computers and mobile devices have built-in WiFi support to take advantage of the proliferation of WiFi networks, which provide high-speed wireless data conductivity that provides higher bandwidth than that which typical cellular data connections provide.

Desktop computers that have a higher bandwidth data connection to a meta-network can be used by a mobile device to connect to a meta-network. Such DeskTop PassThrough (DTPT) connections provide high-speed data connectivity between the mobile device and the meta-network with the added advantage of relatively minimal power consumption.

Increasingly, corporations have provided WiFi networks in their offices and would like to automatically provision mobile devices with the WiFi connection settings so that users can access the WiFi networks without any manual intervention. Also, many corporations provide public WiFi access points for which provisioning information is desired to be automatically provisioned onto mobile devices whenever the mobile device is within coverage of the wireless network. Accordingly, initial provisioning information (such as when the mobile device is manually provisioned for a DTPT connection for the first time) is stored and later used for automatic provisioning.

Enabling such provisioning via XML provides operators and corporations a well-known and standardized mechanism to bootstrap the devices with the settings for passthrough connections and also to update them periodically. The standard WAP XML structure is extended to support passthrough connection settings.

XML-based provisioning is used as a means for configuring devices with passthrough connections. Passthrough definitions are made a part of the WAP XML schema to enable provisioning of passthrough connections, and a stand-alone characteristic (or extend already defined characteristics in WAP XML) is used to define passthrough connections.

Using XML based provisioning of passthrough connections enables operators or corporations to bootstrap the device with passthrough connectivity settings in addition to cellular data and proxy connections. The passthrough connections can be provisioning by a user interface (UI) program that takes the user input for the first time the user makes a passthrough connection and provisions the user input information onto the device using XML. Provisioning the user input information enables the mobile device to use the information whenever the user, for example, docks the mobile device onto the desktop computer for which the user input information was saved. In addition to providing a well-known standardized mechanism for provisioning the passthrough settings, using XML also enables easy updates of these settings on a periodic basis. The XML information can be delivered through various means.

WAP XML already defines XML schema to provision cellular data connections (e.g. GSM-CSD, GSM-GPRS), proxy connections and access characteristics. Together, these enable the device to be provisioned with various connectivity settings and also the application-specific connection preferences. Making WiFi and DTPT definitions a part of WAP XML makes the WAP XML standard more complete and, at the same time, makes it easier for devices to implement the additional XML that are required by using the existing characteristic/parm structure defined by WAP to enable passthrough provisioning. For example, extending the NAPDEF characteristic to include new bearer types allows the mobile device to be automatically provisioned for passthrough connections across WiFi and DTPT networks.

According to two embodiments of the invention, there are two ways of defining passthrough connections inside WAP XML—either via a stand-alone characteristic or by extending already defined characteristics.

In one of the embodiments, an already defined characteristic named NAPDEF can be extended to specify all the settings related to a passthrough connection:

```
characteristic: NAPDEF *
{
    parm: NAPID
    parm: BEARER *                    // New bearer types -
    "WiFi" and 'DTPT"
    parm: NAME
    parm: NAP-ADDRESS
    parm: NAP-ADDRTYPE ?
    parm: CALLTYPE ?
    parm: LOCAL-ADDR ?
    parm: LOCAL-ADDRTYPE ?
    parm: LINKSPEED ?
    parm: LINGER ?
    parm: TRAFFIC-CLASS ?
    parm: RESIDUAL-BER ?
    parm: SDU-ERROR-RATIO ?
    parm: TRAFFIC-HANDL-PRIO ?
    parm: MAX-BITRATE-DNLINK ?
    characteristic: NAPAUTHINFO *
    {
        parm: AUTHTYPE              // In case of WiFi, can
        be used to specify certificate or WEP key.
        parm: AUTHNAME ?            // In case of DTPT, can
        be used to specify user name and domain.
        parm: AUTHSECRET ?          // In case of WiFi, can
        be used to specify WiFi certificates or WEP keys.
                                    // In case of DTPT, can
            be used to specify password.
    }
}
```

The following example illustrates how the NAPDEF characteristic can be used to define the settings of a passthrough connection:

```
<characteristic type="NAPDEF">
    <parm name="NAPID" value="WiFi1"/>
    <parm name="BEARER" value="WiFi"/>
    <parm name="NAME" value="MYCOMPANY_WIFI"/>
    <characteristic type="NAPAUTHINFO">
        <parm name="AUTHTYPE" value="WEP" />
        <parm name="AUTHSECRET" value="1f2f3f4f" />
    <characteristic>
</characteristic>
<characteristic type="NAPDEF">
    <parm name="NAPID" value="DTPT1"/>
    <parm name="BEARER" value="DTPT"/>
    <parm name="NAME" value="HOMECOMPUTER_DTPT"/>
    <characteristic type="NAPAUTHINFO">
        <parm name="AUTHTYPE" value=" " />
        <parm name="AUTHNAME" value="mydomain\myuser" />
        <parm name="AUTHSECRET" value="mypassword" />
    <characteristic>
</characteristic>
```

Figure 4:
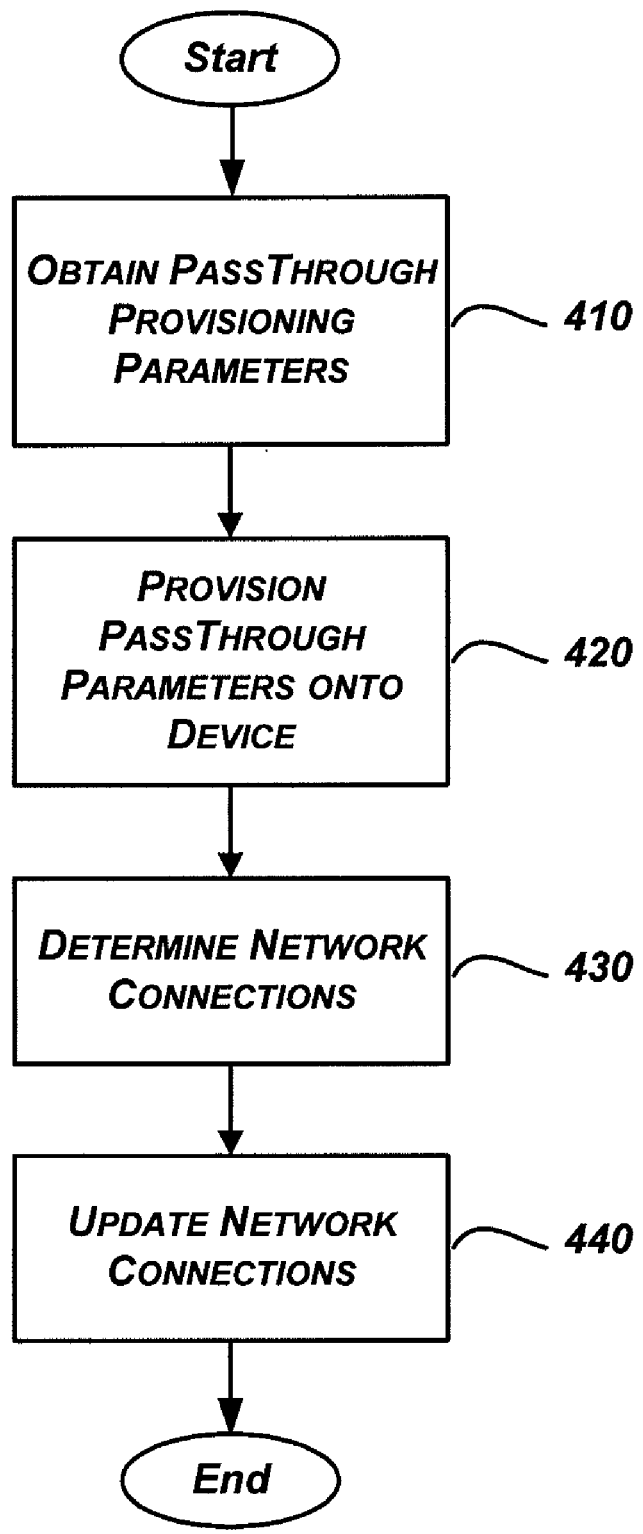
FIG. 4 illustrates a process for provisioning a device with passthrough connections, in accordance with aspects of the invention.

FIG. 4 illustrates a process for provisioning a device with passthrough connections, in accordance with aspects of the invention.

After a start block, the process flows to block 410 where passthrough provisioning parameters are obtained. The parameters may be obtained in many different ways. For example, the parameters may be stored on a SIM card associated with the mobile device, or the parameters may be transferred to the device by a program. Moving to block 420, the parameters are incorporated onto the device automatically. In this way, the user does not have to manually set all of the parameters associated with the passthrough connection. Flowing to block 430, the network connections that the device may use to connect to the passthrough may be determined.

This may be accomplished in many different ways. For example, the connections may be already known by the device, or as the device learns of new connections then these connections can be incorporated into the device. Moving to block 440, the passthrough connections are updated based on the determined network connections. The process then moves to an end block and returns to processing other actions.

The above specifications, examples and data provide a complete description of the manufacture and use of the composition of the invention. Since many embodiments of the invention can be made without departing from the spirit and scope of the invention, the invention resides in the claims hereinafter appended.

What is claimed is:

1. A method for provisioning passthrough connections between a mobile device and a meta-network, comprising:
   obtaining a first passthrough definition for the mobile device;
   using the first passthrough definition to connect the mobile device to the meta-network;
   receiving in the mobile device a second passthrough definition through the connection to the meta-network; and
   storing the second passthrough definition in the mobile device; wherein the first passthrough definition and the second passthrough definition are incorporated into a WAP XML schema that defines XML schema to provision cellular data connections, proxy connections and access characteristics; wherein the WAP XML schema is extended to include a bearer type for WiFi and a bearer type for DTPT.

2. The method of claim 1, further comprising using the second passthrough definition to connect the mobile device to the meta-network.

3. The method of claim 1, wherein the passthrough definition is incorporated into the WAP XML that defines XML schema to provision cellular data connections, proxy connections and access characteristics by extending a previously defined NAPDEF characteristic.

4. The method of claim 1, wherein the passthrough connection is a desktop passthrough connection.

5. The method of claim 4, wherein the meta-network is the Internet.

6. The method of claim 1, wherein the passthrough connection is a WiFi connection.

7. The method of claim 4, wherein the meta-network is the a corporate network.

8. The method of claim 1, wherein the first passthrough definition is obtained using a SIM card.

9. The method of claim 1, wherein the first passthrough definition is obtained by manual input of a user of the mobile device.

10. The method of claim 1, further comprising:
    receiving in the mobile device a third passthrough definition through the connection to the meta-network; and
    storing the third passthrough definition in the mobile device.

11. A mobile device for using passthrough connections to connect to a meta-network, comprising:
    an interface that is configured to obtain a first passthrough definition for the mobile device;
    a network interface that is configured to use the first passthrough definition to connect the mobile device to the meta-network and is further configured to receive a second passthrough definition through the connection to the meta-network; and
    a memory for storing the second passthrough definition; wherein the first passthrough definition and the second passthrough definition are incorporated into a WAP XML schema that defines XML schema to provision cellular data connections, proxy connections and access characteristics; wherein the WAP XML schema NAPDEF characteristic is extended to include a bearer type for WiFi and a bearer type for DTPT.

12. The device of claim 11, wherein the network interface is further configured to use the second passthrough definition to connect the mobile device to the meta-network.

13. The device of claim 11, wherein the passthrough definition is incorporated into a WAP XML schema.

14. The device of claim 11, wherein the passthrough connection is a desktop passthrough connection.

15. The device of claim 14, wherein the meta-network is the Internet.

16. The device of claim 11, wherein the passthrough connection is a WiFi connection.

17. The device of claim 14, wherein the meta-network is the a corporate network.

18. The device of claim 11, wherein the first passthrough definition is obtained using a SIM card.

19. The device of claim 11, wherein the first passthrough definition is obtained by manual input of a user of the mobile device.

20. The device of claim 11,
    wherein the network interface is further configured to receive a third passthrough definition through the connection to the meta-network and to connect to the meta-network using the third passthrough definition.

21. A computer-readable storage medium containing instructions for provisioning passthrough connections between a mobile device and a meta-network, comprising:
    obtaining a first passthrough definition for the mobile device;
    using the first passthrough definition to connect the mobile device to the meta-network;
    receiving in the mobile device a second passthrough definition through the connection to the meta-network; and
    storing the second passthrough definition in the mobile device; wherein the first passthrough definition and the second passthrough definition are incorporated into a WAP XML schema that is extended to include a bearer type for WiFi and a bearer type for DTPT.

22. The medium of claim 21, further comprising instructions for using the second passthrough definition to connect the mobile device to the meta-network.

23. The medium of claim 21, wherein the passthrough definition is incorporated into a WAP XML schema.

24. The medium of claim 21, further comprising instructions for receiving in the mobile device a third passthrough definition through the connection to the meta-network and storing the third passthrough definition in the mobile device.

25. A mobile device for using passthrough connections to connect to a meta-network, comprising:
    means for obtaining a first passthrough definition for the mobile device;
    means for using the first passthrough definition to connect the mobile device to the meta-network and receiving a second passthrough definition through the connection to the meta-network; and
    means for storing the second passthrough definition; wherein the first passthrough definition and the second passthrough definition are incorporated into a WAP XML schema that defines XML schema to provision cellular data connections, proxy connections and access characteristics and includes a bearer type for WiFi and a bearer type for DTPT.

* * * * *